F. D. PHILP.
GREASE CUP.
APPLICATION FILED JUNE 18, 1910.

1,085,478.

Patented Jan. 27, 1914.

Witnesses:-

Inventor
Frederick D. Philp.
by his Attorneys,
Howson & Howson

UNITED STATES PATENT OFFICE.

FREDERICK D. PHILP, OF PHILADELPHIA, PENNSYLVANIA, ASSIGNOR TO POWELL EVANS, OF PHILADELPHIA, PENNSYLVANIA.

GREASE-CUP.

1,085,478.  Specification of Letters Patent.  Patented Jan. 27, 1914.

Application filed June 18, 1910. Serial No. 567,581.

*To all whom it may concern:*

Be it known that I, FREDERICK D. PHILP, a citizen of the United States, residing in Philadelphia, Pennsylvania, have invented certain Improvements in Grease-Cups, of which the following is a specification.

One object of my invention is to provide a so called "cup" for grease or other lubricant, which shall be inexpensive to manufacture as well as of a simple and substantial construction.

It is further desired to provide a grease cup made in two parts designed to screw together and provided with means whereby the accidental unscrewing of these parts under the action of vibration or shocks shall be effectually prevented.

Another object of the invention is to provide a grease cup whose cover and body shall be firmly held or locked together against relative movement by a spring so placed within the cup that it shall oppose a greater resistance to the separation of the parts than to the act of connecting them.

These objects and other advantageous ends I secure as hereinafter set forth, reference being had to the accompanying drawings, in which:—

Figure 2:
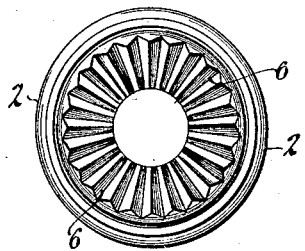
Figure 1:
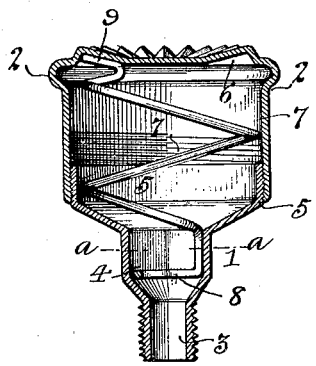
Figure 3:
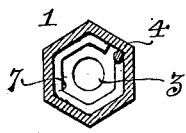

Figure 1, is a vertical section of a grease cup constructed according to my invention; Fig. 2, is an inverted plan of the top section of the cup, and Fig. 3, is a horizontal section on the line *a—a*, Fig. 1.

In the above drawings, 1 represents the lower portion of a grease cup made in two parts of which the second portion is indicated at 2 and which with the part 1, is preferably made of pressed metal. The part 1 has an externally threaded outlet 3 leading from a chamber 4 whose interior form as well as its exterior contour is hexagonal or otherwise irregular in form and which in turn leads into the main hopper shaped portion 5. This latter part is externally threaded for the reception of the cover portion 2 whose top is provided with a series of internal radiating ribs or corrugations 6. For holding these two parts 1 and 2 together against the effect of continued vibration, I provide a coil spring 7 within the cup formed of wire preferably bent as shown and having its lower end 8 of such length and form as to fit within the hexagonal chamber 4 so as to hold the spring from revolution around the vertical center line of the cup. The upper end of the spring is turned over and extended outwardly in a radial direction as indicated at 9, so as to be capable of fitting between any of the radial ribs or corrugations 6 on the inside of the part 2 of the cup. The length and design of the spring are such that after the cup has been filled with grease, the part 2 may be screwed onto the part 1. In order to permit this action, the end 9 of the spring slips from space to space between the ribs 6; the coil or coils of the spring being wound in such a direction that the screwing together of the parts of the cup tends to wind up the spring or coil more tightly. As is obvious, however, the continued screwing of the part 2 upon the part 1 compresses the spring 7, and any tendency of said parts to unscrew or separate is resisted by the spring which naturally opposes any unwinding of its coils such as tends to occur when the ribs of the part 2 press against the end 9 of said spring. Thereafter, even though the cup be subjected to vibration or shocks, it is a matter of practical impossibility for the part 2 to become unscrewed from the part 1, so that accidental separation of the two parts of the cup is effectually prevented; although it is still possible to unscrew the parts by hand, in which case the end 9 slips from rib to rib, offering greater resistance however to the relative turning of the two parts of the cup than when one of them is moved in the opposite direction.

The hexagonal part of the cup is conveniently elongated for the reception of a wrench whereby said cup may be screwed into place and as above noted it also serves to hold the spring from revolution while permitting it to intermittently resist relative turning of the cover 2.

I claim:—

The combination in a grease cup of two parts made of relatively thin pressed metal separably screwed together, one of said parts having a main chamber, an intermediate chamber whose interior contour is other than circular, and a threaded outlet leading from said latter chamber, the other part having the interior of its top formed with a series of ribs radiating from its center; with a wire coil loosely mounted in the cup, having one end shaped to fit into and conform to the contour of the intermediate chamber of the first part of the cup, and its other end shaped to movably engage the radiating ribs of the other part of said cup to oppose rotation of said part on said first part.

In testimony whereof, I have signed my name to this specification, in the presence of two subscribing witnesses.

FREDERICK D. PHILP.

Witnesses:
WILLIAM E. BRADLEY,
WM. A. BARR.